(12) United States Patent
Lifshitz et al.

(10) Patent No.: US 7,324,586 B2
(45) Date of Patent: Jan. 29, 2008

(54) METHOD AND SYSTEM FOR COMMUNICATION BACKWARD COMPATIBILITY

(75) Inventors: Israel Lifshitz, Jerusalem (IL); Ran Kern, Tel Aviv (IL); Boaz Kol, Tel Aviv (IL)

(73) Assignee: Coppergate Communication, Ltd., Tel Aviv (IL)

( * ) Notice: Subject to any disclaimer, the term of this patent is extended or adjusted under 35 U.S.C. 154(b) by 1286 days.

(21) Appl. No.: 10/055,197

(22) Filed: Jan. 21, 2002

(65) Prior Publication Data
US 2003/0139151 A1  Jul. 24, 2003

(51) Int. Cl.
H04B 1/38 (2006.01)
H04L 27/00 (2006.01)

(52) U.S. Cl. ........................ 375/222; 375/295; 375/316
(58) Field of Classification Search ................ 375/222, 375/219, 295, 316
See application file for complete search history.

(56) References Cited

U.S. PATENT DOCUMENTS

| | | | |
|---|---|---|---|
| 5,987,068 A | 11/1999 | Cassia et al. | 375/281 |
| 6,011,807 A | 1/2000 | Castagna et al. | 370/506 |
| 6,298,051 B1 | 10/2001 | Odenwalder et al. | 370/342 |
| 2002/0003835 A1 | 1/2002 | Wu | |
| 2002/0015404 A1* | 2/2002 | Fisher et al. | 370/352 |
| 2002/0019966 A1 | 2/2002 | Yagil et al. | |
| 2003/0156592 A1 | 8/2003 | Ojard et al. | |
| 2003/0156656 A1 | 8/2003 | Ojard et al. | |

* cited by examiner

*Primary Examiner*—Chieh M. Fan
*Assistant Examiner*—Jason M. Perilla
(74) *Attorney, Agent, or Firm*—Darby & Darby PC (57) ABSTRACT

Communications method including the procedures of modulating a second generation carrier signal, with a first generation Baseband bandwidth signal, when transmitting to first generation devices, and, modulating the second generation carrier signal, with a second generation Baseband bandwidth signal, when transmitting to second generation devices, wherein the frequency of the second generation carrier signal, is an integer multiple of the first generation Baseband bandwidths, away from a first generation carrier signal frequency.

37 Claims, 9 Drawing Sheets

METHOD AND SYSTEM FOR COMMUNICATION BACKWARD COMPATIBILITY

FIELD OF THE TECHNOLOGY

The disclosed technique relates to communication methods and systems, in general, and to methods and systems which are backward compatible with prior generations thereof, in particular.

BACKGROUND OF THE DISCLOSED TECHNIQUE

Networked devices communicate using signals sent over a common physical media networks, which can be wired or wireless. Such a network interconnects devices of different generations having different communication parameters. Backward compatibility of new generation devices with older generation devices, is a desired quality. Compatibility implies that new generation devices do not interfere with old generation transmissions. Compatibility further implies that new generation devices and old generation devices, are able to communicate there between.

Such devices may be connected in a point-to-point architecture, wherein only two such devices are connected, or in a networked architecture, wherein a plurality of devices share the same physical communication medium and intercommunicate there between.

Conventional communication standards employ several methods in order to ensure backward compatibility. One type of such methods is called "Fall-back". "Fall-back" methods artificially degrade the capabilities of the later generation device, forcing them to be comparable with those of prior generation devices. A network which is composed of both prior and later generation devices, operates according to the communication standard of the prior generation devices, even for communication between two later generation devices.

Another type of such methods is called self-describing frame format methods. In these methods, when two later generation devices communicate, later generation data formatted transmission is encapsulated, such that the header of the transmission is in prior generation format. The header can include information related to the generation of the data encapsulated thereafter or information related to a destination node. A prior generation device, receiving such data, after decoding the header portion of the data, shall determine that this data is not intended therefore and hence shall ignore the rest of the data. A later generation device, receiving the same transmission, after decoding the header, will decode the rest of the data, using the newer communication standards.

A further method of providing backwards compatibility, is by adding a component, to each prior generation device, which will provide translation capabilities, of later generation standards, to those recognizable by the prior generation device, and vice versa. Such devices allow communication across the network to be conducted, using later generation technology, while allowing prior generation devices, to participate in the data exchange across the network.

U.S. Pat. No. 6,298,051, entitled "High-data-rate supplemental channel for CDMA telecommunications system", issued to Odenwalder et al., is directed to a method for transmitting a supplemental high rate data channel in tandem with existing data channels over a CDMA over-the-air transmission. This is accomplished by providing a quadrature-phase channel, orthogonal to the in-phase channels used to transmit normal-rate CDMA data, in such a way as to avoid interfering with the in-phase channel. Thus, normal rate capable CDMA devices, which are unable to detect the quadrature-phase channel, are not influenced by the high rate data. The method thus illustrated ensures compatibility of the high-rate capable devices with the normal rate devices.

U.S. Pat. No. 6,011,807, entitled "Method and apparatus for transmitting data in a high rate, multiplexed data communication system", issued to Castagna et al., is directed to a method and apparatus for determining synchronization and loss of synchronization in a high rate multiplexed data system. The method employs a backwards compatibility flag that allows the apparatus to operate with older systems. By using the backwards compatibility flag to detect if an incoming transmission is initiated in an older system, and activating relevant circuitry accordingly, the apparatus is able to maintain compatibility with older systems.

U.S. Pat. No. 5,987,068, entitled "Method and apparatus for enhanced communication capability while maintaining standard channel modulation compatibility", issued to Cassia et al., is directed to a method for enhancing communication capabilities. The method modulates a first communication signal, using a standard modulation technique, onto a carrier signal, thereby producing a first transmission signal. The method further modulates a supplemental communication signal onto the first transmission signal, thereby producing a combined transmission signal, which is then broadcast. The standard modulation scheme for the first communication signal, is differential quadrature phase shift keying (DQPSK). When the combined transmission signal is demodulated using DQPSK, the first communication signal is extracted there from. When a receiving device is aware of the enhanced modulation scheme used in the combined transmission signal, it demodulates the signal accordingly, extracting both the first communication signal, and the supplemental communication signal. When a receiving is not aware of the enhanced modulation scheme it demodulated the combined transmission signal using DQPSK demodulation, extracting the first communication signal. Thus compatibility is ensured when transmitting to a device unaware of the enhanced modulation scheme used.

IEEE Standard 802.3 details the standards for the Ethernet local networking interface and protocol. The 802.3 standard encompasses technologies of various communication rates, namely 10 Mbps, 100 Mbps and 1000 Mbps. In order to ensure backwards compatibility between newer high-rate devices and older low-rate devices, the standard details an auto-negotiation implementation. Accordingly, high-rate devices detect a transmission from a low-rate device, infer a connection to such a device, and reduce the communication rate accordingly. Such a rate reduction ensures backward compatibility with the low-rate communication device.

A family of communication specifications which exhibit backward compatibility, is known as Home Phoneline Networking Alliance (HPNA). The first generation, HPNA-1, defines transmission around a carrier frequency $F_{HPNA-1}$, with Pulse Position Modulation.

The second generation defines transmission around a carrier frequency $F_{HPNA-2}$ ($F_{HPNA-2} \approx F_{HPNA-1}$), but with Frequency Diverse/Quadrature Amplitude Modulation (FDQAM/QAM). An HPNA-2 device which communicates with an HPNA-1 device, transmits an HPNA-1 format pulsed transmission around $F_{HPNA-1}$ using an HPNA-1 transmitter incorporated into the HPNA-2 device. MANGER In the presence of HPNA-1 devices, an HPNA-2 device which communicates with a non-HPNA-1 device, commences a transmission with an HPNA-1 format pulsed like header, encapsulating information which causes HPNA-1 devices to discard the rest of the transmission.

SUMMARY OF THE DISCLOSED TECHNIQUE

It is an object of the disclosed technique to provide a novel method and system for backward compatibility between different generations of communication devices, interconnected on the same physical network.

In accordance with the disclosed technique, there is thus provided a method to ensure backward compatibility between different generations of communication devices. The method includes the procedure of selecting a carrier frequency, for the new generation devices, located an integer number of old generation Baseband bandwidths, away from an old generation carrier frequency. The method further includes the procedure of selecting a frequency range, for the new generation devices, overlapping at least one instance of the old generation transmission signal. The method further includes the procedure of modulating the new generation carrier signal with an old generation Baseband bandwidth, when transmitting to old generation devices. The modulation creates at least one copy of the Baseband signal, centered on an old generation carrier frequency, thus, old generation devices, can demodulate the Baseband signal, thereby receiving data from new generation devices.

In accordance with another aspect of the disclosed technique, there is thus provided a new generation communication device which can transmit backward compatible signals, to old generation devices. The device includes a high baud rate signal generator, a low baud rate signal generator, an up-sampler, a controller, a switch, a carrier signal generator, a modulator and a communication interface. The high baud rate signal generator and the up-sampler are coupled with the switch. The up-sampler is further coupled with the low baud rate signal generator. The switch is further coupled with the controller and with the modulator. The modulator is further coupled with the carrier signal generator and with the communication interface. When data is transmitted to new generation devices, the controller selects the high baud rate signal generator, which provides a high rate Baseband signal to the modulator, via the switch. The modulator modulates a carrier signal provided by the carrier signal generator, with the high rate Baseband signal, thereby creating a transmission signal. The communication interface transmits the transmission signal to the network. When data is transmitted to old generation devices, the controller selects the low baud rate signal generator, which provides a low rate Baseband signal to the up-sampler. The up-sampler up-samples the Baseband signal. The up-sampled Baseband signal is provided to the modulator via the switch. The modulator modulates the carrier signal with the up-sampled Baseband signal, thereby creating a transmission signal. The communication interface transmits the transmission signal to the network.

BRIEF DESCRIPTION OF THE DRAWINGS

The disclosed technique will be understood and appreciated more fully from the following detailed description taken in conjunction with the drawings in which.

DETAILED DESCRIPTION OF EMBODIMENTS

The disclosed technique overcomes the disadvantages of the prior art by providing a novel method for communication backward compatibility, which transmits at old generation transmission rate, centered to a new carrier frequency which is located away from the old generation carrier frequency by an integer multiple of a bandwidth which is defined according to old generation transmission rate. The disclosed technique can be implements for both analog, and digital, transmissions.

The terms "old generation" and "new generation" merely represent two different communications specifications, which do not necessarily differ in the point in time, in which each was defined, and hence, for example, can be two communications specifications which were defined at the same time for different purposes. The terms "new" and "old" are interchangeable. Moreover, the two generations can be different modes of operation within the same communications specification. Similarly, such two generations, can be two separate communications specification that belong to different methodologies which belong to different families of methodologies. The disclosed technique can be applied to any two communications specifications, which comply with basic requirements, such as outlined herein below.

In the following description the following terms are used:

Data signal—A signal which can be analog or digital, which can be presented at different levels of encoding, such as raw (i.e., not encoded), encapsulated in data packets (which may include additional information such as headers, error detection and correction sections, and the like), encryption, compression, and the like.

Baseband signal—An original band of frequencies produced by a signal generating device, which can be analog or digital. A Baseband signal is usually used to modulate a carrier signal thereby producing a transmission signal. Demodulation of the transmission signal by the carrier signal, re-creates the Baseband signal. Baseband frequencies are usually characterized by being lower in frequency than the frequencies of the transmission signals, and in some cases also lower than the frequencies of carrier signals or sub-carrier signals. The sampling frequency of the Baseband defines a Baseband bandwidth, which is essentially equal thereto. It is noted that the sampling frequency of a digital format Baseband signal is also known as baud-rate.

Carrier signal—A cyclic signal which can be analog or digital, at a frequency which in most cases is higher than that of Baseband signals. It is noted that in conventional communication standards, a carrier signal is characterized by a fixed predetermined frequency, although a communication standard may define a plurality of carrier signals, each at a different frequency.

Transmission signal—A signal which is physically transmitted across a physical medium, wired or wireless. The transmission signal is produced by modulating the carrier signal with the Baseband signal. The transmitted signal typically centers on the carrier signal and spreads at least across a range of frequencies, which can be finite or infinite.

Delta function—A single infinite peak, which exists only at a predetermined point, in a given domain. The fundamental property of a delta function, is that the integration of the product of a delta function, and a signal function, over the entire domain, equals the value of the signal function, at the point where the delta function is infinite.

Delta function array—A series of delta functions, spaced apart at a predetermined interval, in a given domain.

Fourier transform—A mathematical transformation of a function, from one domain to another. The transformed function can be discrete (e.g., a delta function, a plurality of delta functions, and the like) or continuous (e.g., a SIN function, and the like) as is the result of the transformation. In the following description, Fourier transforms are performed between the time domain and the frequency domain.

Up-sampling—inserting additional samples in a stream of original samples, at predetermined locations therein. Up-sampling increases the spacing between the original samples.

The Baseband signal is a series of values, each at a certain point in time and hence, the Baseband signal can be represented as a series of delta functions in the time domain, spaced apart at a predetermined interval. The Baseband signal modulates the carrier signal, thereby producing the transmission signal. Extracting the data signal from a received transmission signal requires demodulation of the carrier signal, to obtain the Baseband signal.

It will be appreciated by those skilled in the art that a product of the Baseband signal and the carrier signal, in the time domain is equivalent to the convolution of the Fourier transform of the two signals.

$$\delta(t) \cdot f(t) \Leftrightarrow F(\omega) * \Delta(\omega)$$

It is noted that a Fourier transform of a delta function array in one domain, is also a delta function array, with a different interval in another domain.

In addition, when a delta function array signal is modulated on a continuous signal, the product signal is equal to a convolution of the two. The product signal, when represented in the frequency domain, contains a plurality of copies of a basic signal.

When the continuous signal exhibits a single frequency, each copy of the basic signal is centered on a different frequency, one of them being that of the continuous signal. The center frequencies are spaced according to the bandwidth of the delta function array signal. The number of copies thus created, is such as to completely fill the frequency range of the continuous (carrier) signal.

Multiple copies of a digital format Baseband signal, may be created by up-sampling the Baseband signal. As illustrated above, such up-sampling may be viewed, as a change of the spacing of the delta function array, causing a change in the convolution product. The change in the convolution product, causes multiple copies of the up-sampled Baseband signal, to be produced.

Figure 1:
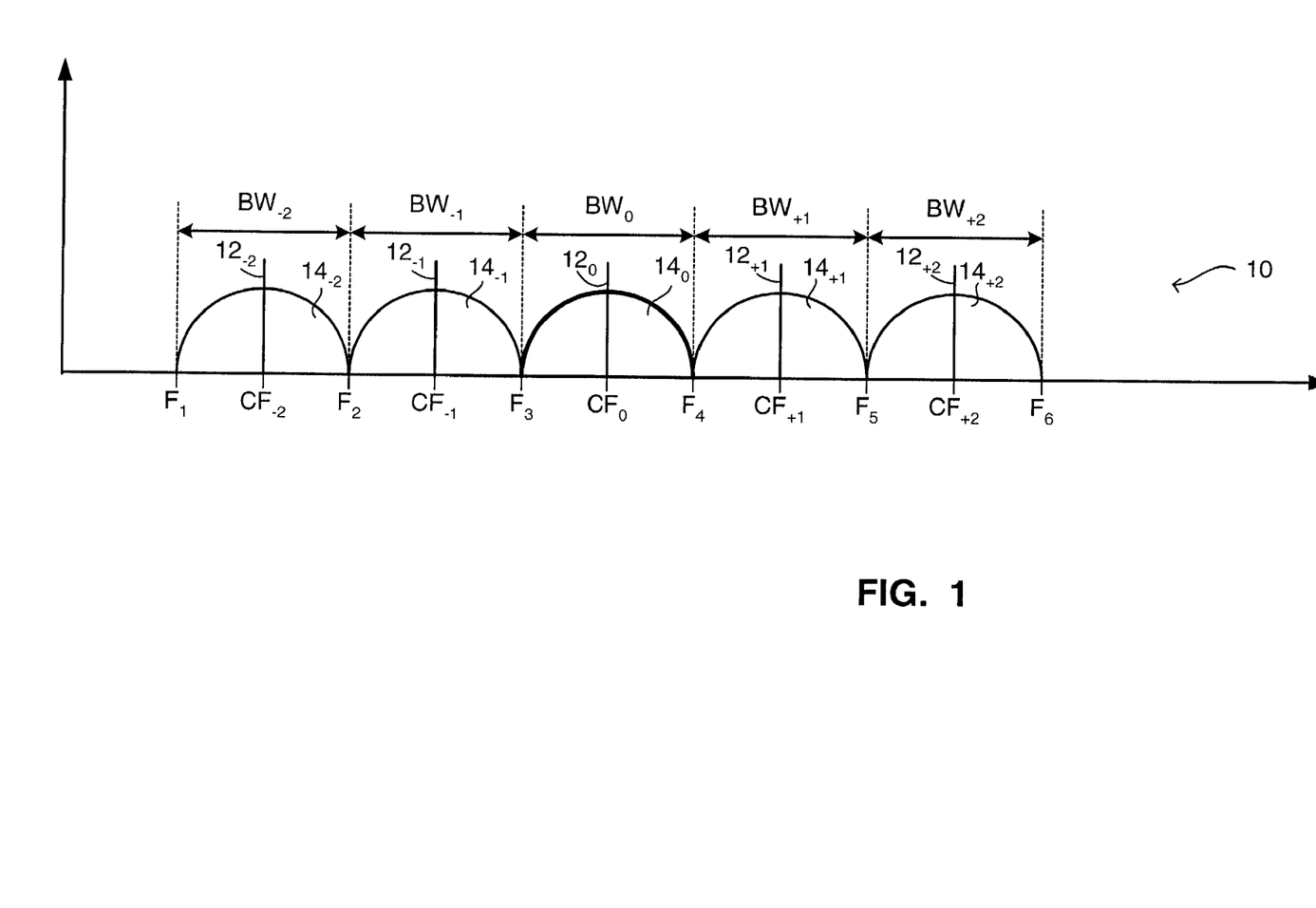
FIG. 1 is a schematic illustration, in the frequency domain, of a transmission signal, which is produced by modulating a discrete Baseband signal onto a continuous carrier signal.

Reference is now made to FIG. 1, which is a schematic illustration, in the frequency domain, of a transmission signal, generally referenced 10, which is produced by modulating a Baseband signal onto a carrier signal.

Transmission signal 10 includes a basic signal $14_0$ and a plurality of basic signal copies $14_{-2}$, $14_{-1}$, $14_{+1}$ and $14_{+2}$ thereof. Basic signal $14_0$ is centered on a center frequency $12_0$, of a value $CF_0$. Basic signal copies $14_{-2}$, $14_{-1}$, $14_{+1}$ and $14_{+2}$ are centered on center frequencies $12_{-2}$, $12_{-1}$, $12_{+1}$ and $12_{+2}$ of values $CF_{-2}$, $CF_{-1}$, $CF_{+1}$ and $CF_{+2}$. In theory, signal 10 can extend from zero frequency to infinity. In practice, such signals are truncated by a truncating bandwidth filter.

Basic signal $14_0$ exhibits a bandwidth $BW_0$, extending from a frequency $F_3$ to a frequency $F_4$, which is typically the bandwidth of the discrete Baseband signal. Basic signal copies $14_{-2}$, $14_{-1}$, $14_{+1}$ and $14_{+2}$ each exhibit bandwidths $BW_{-2}$ (between frequencies $F_1$ and $F_2$), $BW_{-1}$ (between frequencies $F_2$ and $F_3$), $BW_{+1}$ (between frequencies $F_4$ and $F_5$) and $BW_{+2}$ (between frequencies $F_5$ and $F_6$), respectively. It is noted that the value of each bandwidths $BW_{-2}$, $BW_{-1}$, $BW_{+1}$ and $BW_{+2}$ is equal to that of bandwidth $BW_0$.

Demodulating the basic signal $14_0$ with respect to center frequency $12_0$ ($CF_0$) shall reconstruct the modulating discrete Baseband signal. Similarly, demodulating any of the basic signal copies $14_{-2}$, $14_{-1}$, $14_{+1}$ and $14_{+2}$ with respect to their respective center frequencies $12_{-2}$ ($CF_{-2}$), $12_{-1}$ ($CF_{-1}$), $12_{+1}$ ($CF_{+1}$) and $12_{+2}$ ($CF_{+2}$) shall also reconstruct the modulating discrete Baseband signal.

Demodulation of the transmission signal, can be performed in a joint fashion, for all basic signal copies. Joint demodulation is performed with respect to center frequency $12_0$, by sampling the transmission signal, prior to demodulation, thereby centering all basic signal copies, on center frequency $12_0$. Such joint demodulation, can be used to increase robustness, by allowing the Baseband signal to be recreated, from one, or more, basic signal copies.

The disclosed technique makes use of this phenomenon to provide backward compatibility between different generations of communication standards and methods. According to the disclosed technique, a new generation transmitter incorporates a single carrier signal. The carrier signal frequency is located away from an old generation carrier signal frequency, by an integer multiple of a bandwidth which is defined according to an old generation Baseband bandwidth. When transmitting to an old generation unit, the carrier signal is modulated by a Baseband signal, according to an old generation Baseband sampling rate. As described above, this produces a copy of the basic signal around the old generation carrier signal frequency. When transmitting to a new generation unit, the carrier signal is modulated by a different Baseband signal, which may have a higher or a lower Baseband sampling rate, than that of the old generation.

Figure 2:
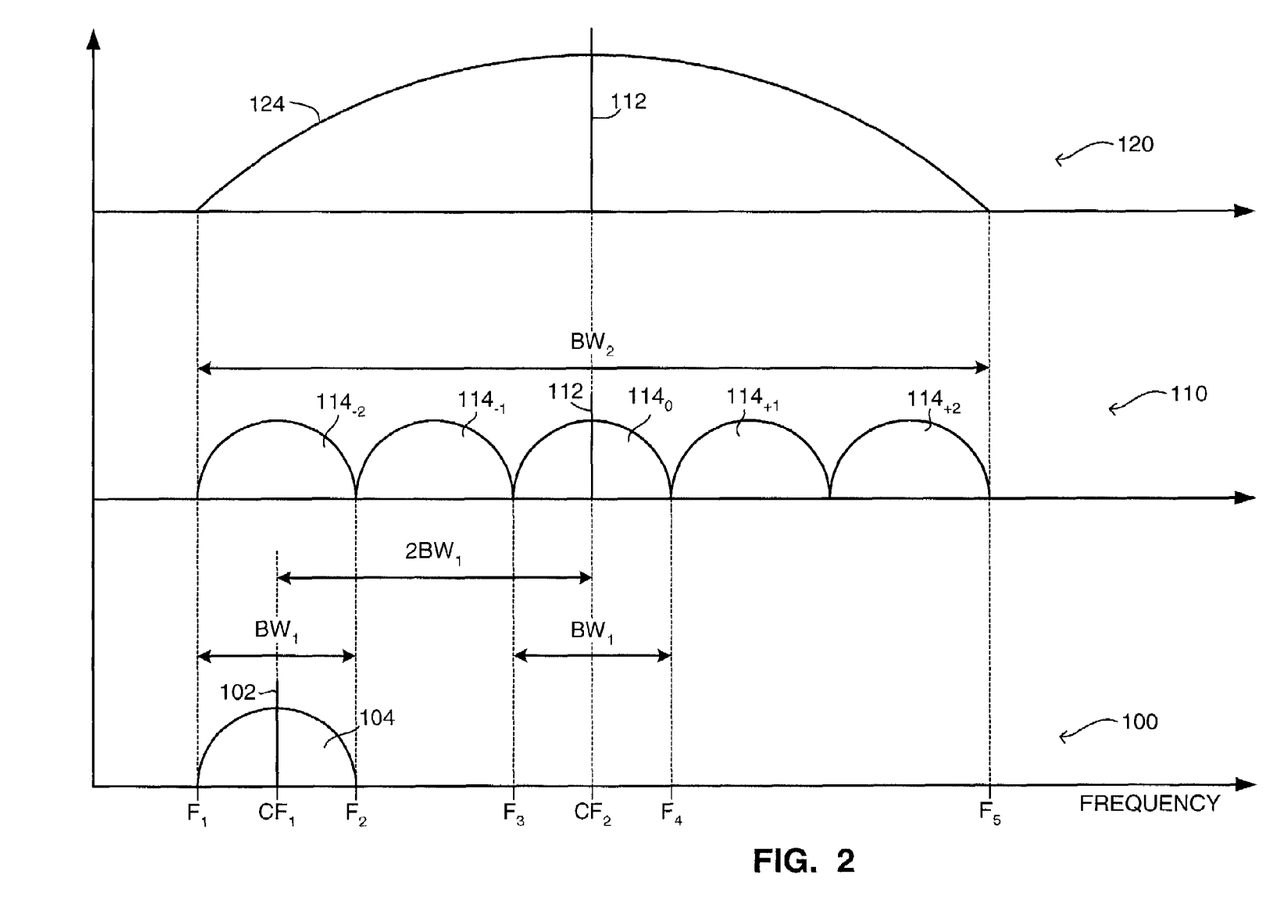
FIG. 2 is a schematic illustration, in the frequency domain, of three transmission signals, some of which are defined and produced in accordance with an embodiment of the disclosed technique.

Reference is now made to FIG. 2, which is a schematic illustration, in the frequency domain, of three transmission signals, generally referenced 100, 110 and 120. Transmission signals 110 and 120 are defined and produced in accordance with an embodiment of the disclosed technique. Transmission signals 100, 110 and 120 are produced by modulating discrete Baseband signals onto carrier signals.

Transmission signal 100 includes a basic signal 104, which is centered on a center frequency 102 ($CF_1$) and exhibits a bandwidth $BW_1$ extending between frequencies $F_1$ and $F_2$. Transmission signal 100 is produced by an old generation transducer (not shown) and is intended for any unit which is compatible therewith (i.e., typically, old generation units and newer generation units which are compatible with the old generation).

Transmission signal 120 includes a basic signal 124, which is centered on a center frequency 112 ($CF_2$) and exhibits a bandwidth $BW_2$ extending between frequencies $F_1$ and $F_5$. Transmission signal 120 is produced by a new generation transducer (not shown) and is intended to any unit which is compatible therewith (i.e., typically, new generation units).

Transmission signal 110 includes a basic signal $114_0$, which is centered on center frequency 112 ($CF_2$) of transmission signal 120, and exhibits a bandwidth $BW_1$, extending between frequencies $F_3$ and $F_4$. Transmission signal 110 further includes basic signal copies $114_{-2}$, $114_{-1}$, $114_{+1}$ and $114_{+2}$. Basic signal copy $114_{-2}$ is centered on center frequency 102 ($CF_1$) and exhibits a bandwidth $BW_1$ extending between frequencies $F_1$ and $F_2$. Accordingly, when received by an old generation unit, basic signal copy $114_{-2}$ shall be perceived as an old generation transmission. That old generation unit can demodulate basic signal copy $114_{-2}$ with respect to center frequency 102 ($CF_1$) in order to then sample the original Baseband signal, according to the old generation Baseband sampling rate.

Accordingly, a new generation unit can produce transmission signal 110 and transmitted to any unit which is compatible with the old generation (i.e., typically, old generation units and newer generation units which are compatible with the old generation).

According to the disclosed technique, the new generation carrier signal center frequency is selected to be away from the old generation carrier signal center frequency, by an integer multiple of a bandwidth which is defined according to old generation Baseband bandwidth. In the example set forth in FIG. 2, center frequency 112 ($CF_2$) is selected to be greater than old generation center frequency 102 ($CF_1$) by twice the bandwidth $BW_1$.

According to one aspect of the disclosed technique, the new generation carrier signal center frequency can be located higher than that of the old generation carrier frequency, as described in the example set forth in FIG. 2, or lower than the old generation carrier frequency. According to another aspect of the disclosed technique, the actual spectrum of frequencies which is covered by the bandwidth of the new generation transmission signal can extend beyond the actual spectrum of frequencies which is covered by the bandwidth of the old generation transmission signal. Both of these aspects as shall be described herein below, in FIG. 3.

Figure 3:
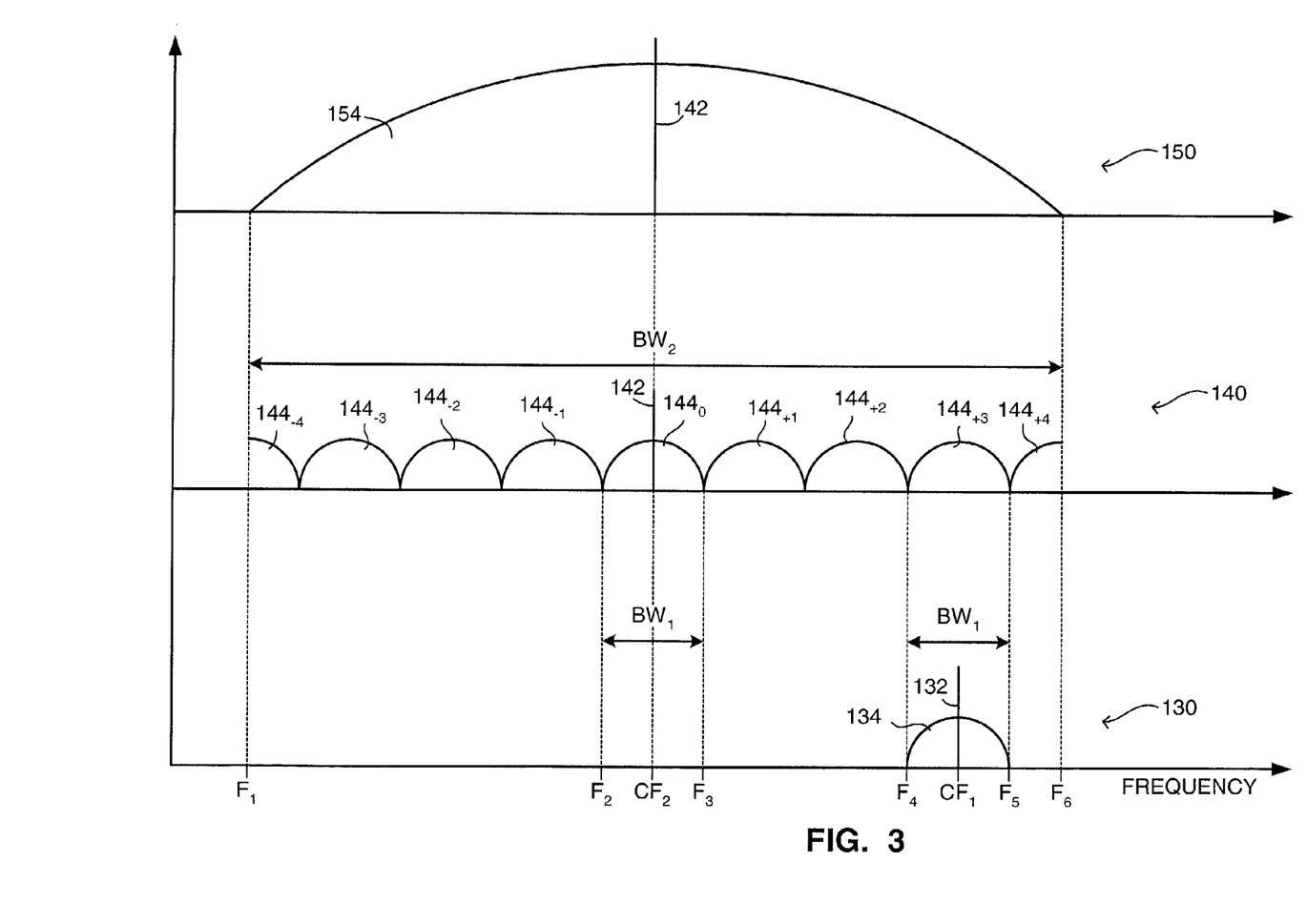
FIG. 3 is a schematic illustration, in the frequency domain, of three transmission signals, some of which are defined and produced in accordance with another embodiment of the disclosed technique.

Reference is now made to FIG. 3, which is a schematic illustration, in the frequency domain, of three transmission signals, generally referenced 130, 140 and 150. Transmission signals 140 and 150 are defined and produced in accordance with another embodiment of the disclosed technique. Transmission signals 130, 140 and 150 are produced by modulating discrete Baseband signals onto continuous carrier signals.

Transmission signal 130 includes a basic signal 134, which is centered on a center frequency 132 ($CF_1$) and exhibits a bandwidth $BW_1$ extending between frequencies $F_4$ and $F_5$. Transmission signal 130 is produced by an old generation transducer (not shown) and is intended to any unit which is compatible therewith (i.e., typically, old generation units and newer generation units which are compatible with the old generation).

Transmission signal 150 includes a basic signal 154, which is centered on a center frequency 142 ($CF_2$) and exhibits a bandwidth $BW_2$, extending between frequencies $F_1$ and $F_6$. Transmission signal 150 is produced by a new generation transducer (not shown) and is intended to any unit which is compatible therewith (i.e., typically, new generation units).

Transmission signal 140 includes a basic signal $144_0$, which is centered on center frequency 142 ($CF_2$) of transmission signal 150, and exhibits a bandwidth $BW_1$, extending between frequencies $F_2$ and $F_3$. Transmission signal 140 further includes basic signal copies $144_{-4}$, $144_{-3}$, $144_{-2}$, $144_{-1}$, $144_{+1}$, $144_{+2}$, $144_{+3}$ and $144_{+4}$. It is noted that basic signal copies $144_{-4}$ and $144_{+4}$ are partial copies of basic signal $144_0$, as transmission signal 140 is limited by the same bandwidth filter which limits signal 150.

Basic signal copy $144_{+3}$ is centered on center frequency 132 ($CF_1$) and exhibits a bandwidth $BW_1$ extending between frequencies $F_4$ and $F_5$. Accordingly, when received by an old generation unit, basic signal copy $14_{+3}$ shall be perceived as an old generation transmission. That old generation unit can demodulate basic signal copy $14_{+3}$ with respect to center frequency 132 ($CF_1$) in order to then sample the original Baseband signal, according to the old generation baud rate.

Accordingly, a new generation unit can produce transmission signal 140 and transmitted to any unit which is compatible with the old generation (i.e., typically, old generation units and newer generation units which are compatible with the old generation).

The disclosed technique is applicable for wired communications as well as wireless communications. The example which is described in FIG. 4 herein below, addresses a wired communication standard, known as Home Phoneline Networking Alliance ver. 2, which is also called HPNA-2. This example shall present general requirements from a future new generation standard, which shall be here referred to as HPNA-X.

Figure 4:
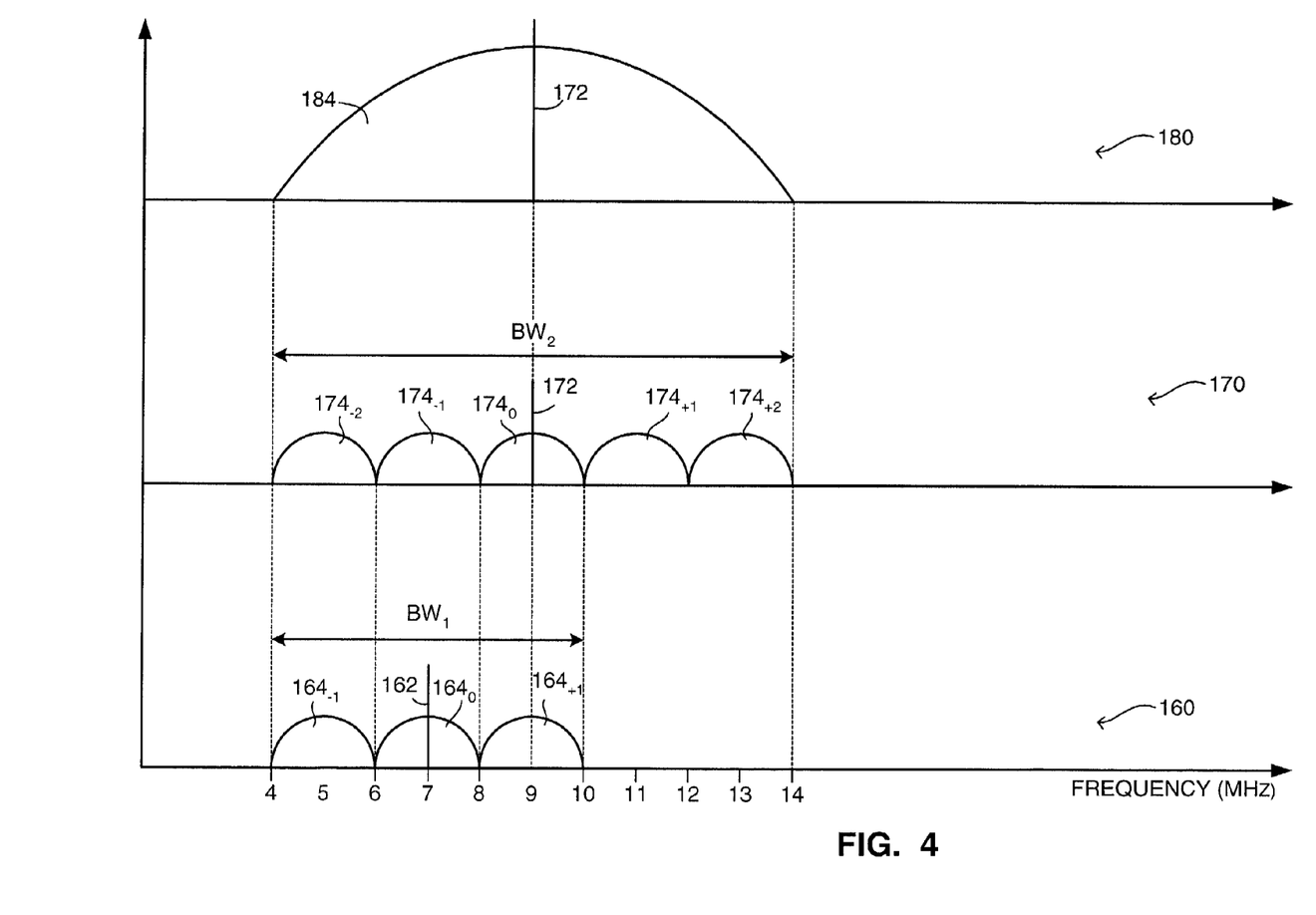
FIG. 4 is a schematic illustration, in the frequency domain, of an HPNA-2 first mode of operation transmission signal and two additional transmission signals defined and produced in accordance with a further embodiment of the disclosed technique.

Reference is now made to FIG. 4, which is a schematic illustration, in the frequency domain of three transmission signals, generally referenced 160, 170 and 180. Transmission signals 170 and 180 are defined and produced in accordance with a further embodiment of the disclosed technique. Transmission signals 160, 170 and 180 are produced by modulating discrete Baseband signals onto carrier signals.

Transmission signal 160 is produced according to HPNA-2 communication standard. Transmission signal 180 is produced according to HPNA-X communication standard. Transmission signal 170 is produced according to HPNA-X communication standard but is intended to be received by HPNA-2 communication standard compatible units.

HPNA-2 communication standard defines a transmission signal which is centered on a carrier signal center frequency of 7 MHz, HPNA-2 communication standard further defines an overall bandwidth of 6 MHz, extending from 4 MHz to 10 MHz. The Power Spectral Density (PSD) mask for HPNA-2, is defined by ITU recommendation G.PNT.F.

HPNA-2 communication standards include several modes of operation for producing a transmission signal with that carrier signal center frequency of 7 MHz. According to the first HPNA-2 communication standard mode of operation, which shall be referred herein after HPNA-2A, a 2 MHz bandwidth Baseband signal modulates the carrier signal center frequency of 7 MHz. According to the first mode of operation HPNA-2A, the produced transmission signal includes three instances of a basic signal. With reference to FIG. 4, HPNA-2 transmission signal 160 includes a basic signal $164_0$ and two basic signal copies $164_{-1}$ and $164_{+1}$.

Basic signal $164_0$ is centered on a center frequency 162 (7 MHz) and exhibits a bandwidth of 2 MHz, extending between 6 MHz and 8 MHz. Basic signal copy $164_{-1}$ is centered on 5 MHz and exhibits a bandwidth of 2 MHz, extending between 4 MHz and 6 MHz. Basic signal copy $164_{+1}$ is centered to 9 MHz and exhibits a bandwidth of 2 MHz, extending between 8 MHz and 10 MHz. The HPNA-2 communication standard defines the two basic signal copies $164_{-1}$ and $164_{+1}$ for purposes such as improved robustness, and the like. Transmission signal 160 is produced by an HPNA-2 transducer (not shown) and is intended for any unit which is compatible with the HPNA-2 communication standard.

According to the example of disclosed technique set forth in FIG. 4, a possible future HPNA-X communication standard defines a transmission signal which is centered on a carrier signal center frequency of 9 MHz, and having a minimal overall frequency range of 10 MHz, extending from 4 Mz to 14 Mz. It is noted that the overall frequency range can be set to be broader than 10 MHz. Transmission signals 170 and 180 are both centered on a single center frequency 172 (9 MHz).

Transmission signal 180 includes a basic signal 184, which is centered on center frequency 172 (9 MHz) and exploits the entirety of the bandwidth of 10 MHz. HPNA-X transducer (not shown) produces transmission signal 180 by modulating the 9 MHz carrier signal with a 10 MHz sampled Baseband signal. Transmission signal 180 is produced by that HPNA-X transducer and is intended for any unit which is compatible with HPNA-X communication standard.

Transmission signal 170 includes a basic signal $174_0$, which is centered to center frequency 172 (9 MHz) of transmission signal 180, and exhibits a bandwidth of 2 MHz, extending between 8 MHz and 10 MHz. Transmission signal 170 further includes basic signal copies $174_{-2}$, $174_{-1}$, $174_{+1}$ and $174_{+2}$.

Basic signal copy $174_{-2}$ is centered on a center frequency of 5 MHz and exhibits a bandwidth of 2 MHz, extending between 4 MHz and 6 MHz. Accordingly, basic signal copy $174_{-2}$ is compatible with basic signal copy $164_{-1}$ of transmission signal 160. Basic signal copy $174_{-1}$ is centered on center frequency 162 (7 MHz) and exhibits a bandwidth of 2 MHz, extending between 6 MHz and 8 MHz. Accordingly, basic signal copy $174_{-1}$ is compatible with basic signal $164_0$ of transmission signal 160. As stated above, basic signal $174_0$ is centered on center frequency 172 (9 MHz) and exhibits a bandwidth of 2 MHz, extending between frequencies 8 MHz and 10 MHz. Accordingly, basic signal $174_0$ is compatible with basic signal copy $164_{+1}$ of transmission signal 160.

Together, basic signal copies $174_{-2}$, $174_{-1}$ and $174_0$ form a signal which is compatible with the requirements of the HPNA-2 communication standard. Accordingly, when received by an HPNA-2 unit, basic signal copies $174_{-2}$, $174_{-1}$ and $174_0$ shall be perceived as an HPNA-2 transmission. Hence, an HPNA-2 unit can demodulate the transmission signal by using basic signal copies $174_{-2}$, $174_{-1}$ and $174_0$, in order to reconstruct the original Baseband signal, according to the HPNA-2 Baseband sampling rate.

It is noted that both transmission signals 180 and 170 are produced by the same HPNA-X unit using the same carrier signal center frequency 172 of 9 MHz.

According to a second HPNA-2 communication standard mode of operation, which shall be referred herein after HPNA-2B, a 4 MHz bandwidth Baseband signal modulates the carrier signal (at a center frequency of 7 MHz). According to the second mode of operation HPNA-2 B, the produced transmission signal includes three instances of basic signals, one of them being complete and the other two being partial. The following example of the disclosed technique presents general requirements from a future HPNA-X standard, which can produce HPNA-2 compatible signals according to both modes of operation HPNA-2A and HPNA-2B, as well as HPNA-X native signals, all being centered on a single carrier center frequency.

Figure 5A:
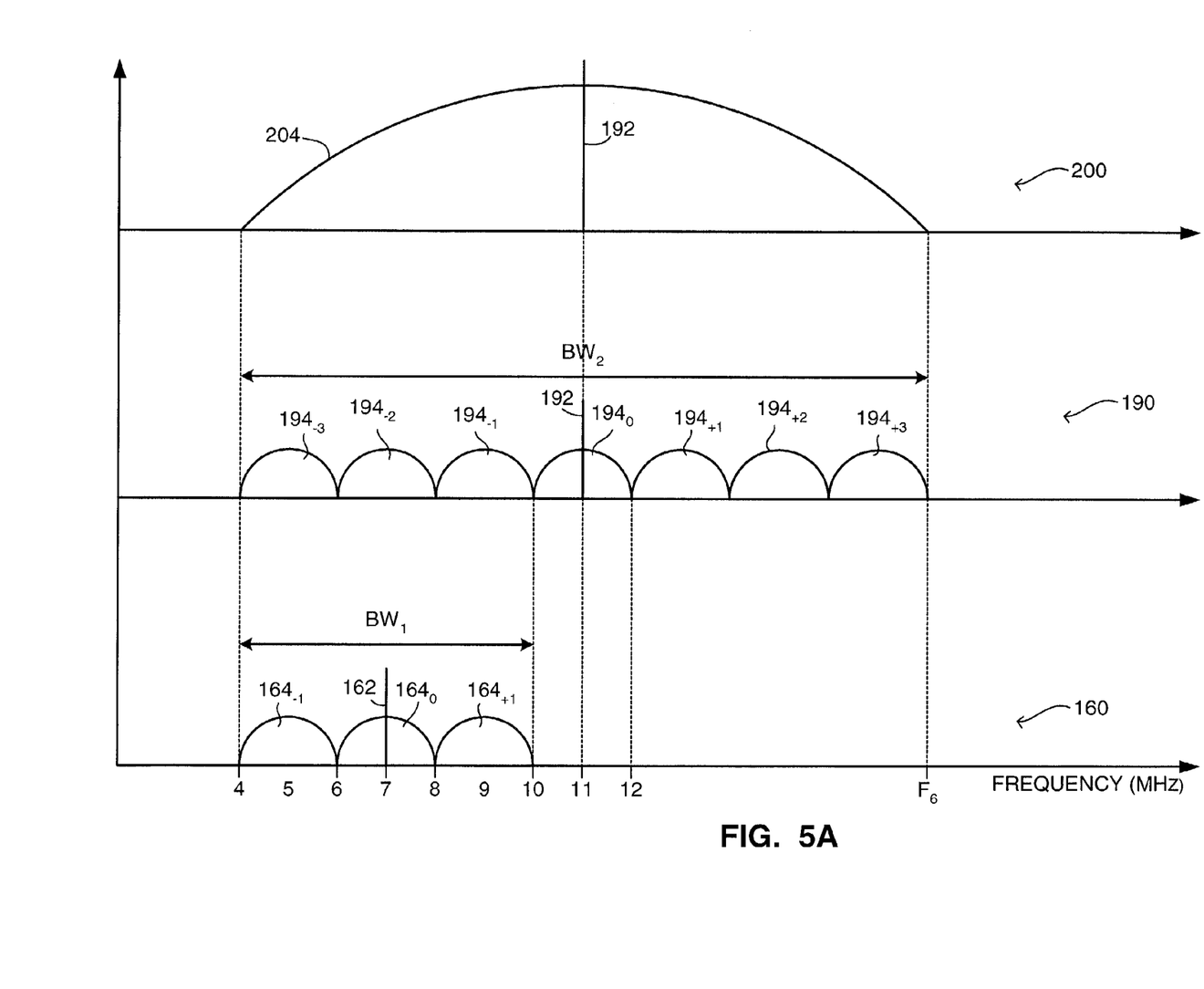
FIG. 5A is a schematic illustration, in the frequency domain, of the HPNA-2 first mode of operation transmission signal of FIG. 4, and two additional transmission signals defined and produced in accordance with a further embodiment of the disclosed technique.
Figure 5B:
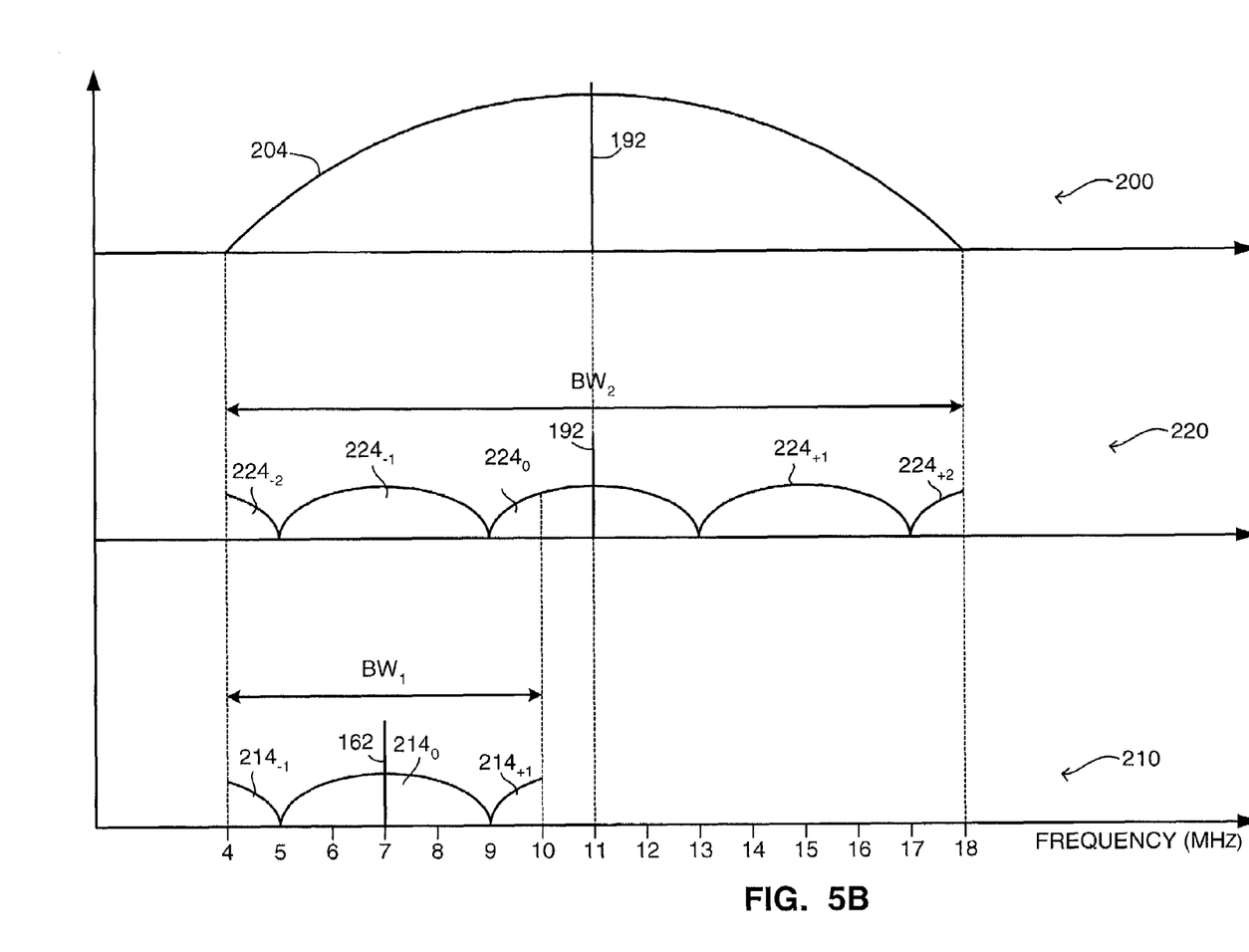
FIG. 5B is a schematic illustration, in the frequency domain, of an HPNA-2 second mode of operation transmission signal, one of the additional transmission signals of FIG. 5A and yet a further transmission signal defined and produced in accordance with a further embodiment of the disclosed technique.

Reference is now made to FIGS. 5A and 5B. FIG. 5A is a schematic illustration, in the frequency domain, of transmission signal 160 of FIG. 4 and two additional transmission signals, generally referenced 190 and 200. FIG. 5B is a schematic illustration, in the frequency domain, of transmission signal 200 of FIG. 5A and two additional transmission signals, generally referenced 210 and 220. Transmission signals 190, 200 and 220 are defined and produced in accordance with another embodiment of the disclosed technique. A detailed description of transmission signal 160 has already been provided herein above, in conjunction with FIG. 4. Transmission signals 190, 200, 210 and 220 are produced by modulating discrete Baseband signals onto carrier signals.

As stated above, transmission signal 160 (FIGS. 4 and 5A) is produced according to the first mode of operation HPNA-2A. Transmission signal 210 (FIG. 5B) is produced according to the HPNA-2 second mode of operation HPNA-2B. Transmission signal 200 is produced according to HPNA-X communication standard. Transmission signal 190 is produced according to HPNA-X communication standard but is intended to be received by HPNA-2 communication standard compatible units, operating according to the first mode of operation HPNA-2A. Transmission signal 220 is produced according to HPNA-X communication standard but is intended to be received by HPNA-2 communication standard compatible units, operating according to the second mode of operation HPNA-2B.

According to the second mode of operation HPNA-2B, the produced transmission signal includes three instances of a basic signal. With reference to FIG. 5B, HPNA-2 transmission signal 210 includes a basic signal $214_0$ and two partial basic signal copies $214_{-1}$ and $214_{+1}$.

Basic signal $214_0$ is centered on the same center frequency 162 (7MHz) as transmission signal 160, and exhibits a bandwidth of 4 MHz, extending between 5 MHz and 9 MHz. Partial basic signal copy $214_{-1}$ is theoretically centered on 3 MHz (not shown) and exhibits a theoretical bandwidth of 4 MHz, extending between 1 MHz and 5 MHz. According to the overall bandwidth of 6 MHz defined by HPNA-2, partial basic signal copy $214_{-1}$ it is truncated below 4 MHz by a truncating bandwidth filter. Partial basic signal copy $214_{-1}$ is theoretically centered on 11 MHz (not shown) and exhibits a theoretical bandwidth of 4 MHz, extending between 9 MHz and 13. According to the overall bandwidth of 6 MHz defined by HPNA-2, it is truncated above 10 MHz by a truncating bandwidth filter.

Transmission signal 210 is produced by an HPNA-2 transducer (not shown) and is intended to any unit which is compatible with HPNA-2 communication standard and can operates according to the second mode of operation HPNA-2B.

According to the example of disclosed technique set forth in FIGS. 5A and 5B, an HPNA-X communication standard defines a transmission signal which is centered on a carrier signal center frequency of 11 MHz, and having a minimal overall frequency range of 14 MHz, extending from 4 Mz to 18 Mz. It is noted that the overall bandwidth can be set to be broader than 14 MHz. Transmission signals 190, 200 and 210 are all centered on a single center frequency 192 (11 MHz).

With reference to FIG. 5A, transmission signal 200 includes a basic signal 204, which is centered on center frequency 192 (11 MHz) and exploits the entirety of the frequency range of 14 MHz. HPNA-X transducer (not shown) produces transmission signal 200 by modulating 11 MHz carrier signal with a 14 MHz sampled Baseband signal. Transmission signal 200 is produced by that HPNA-X transducer and is intended for any unit which is compatible with HPNA-X communication standard.

Transmission signal 190 includes a basic signal $194_0$, which is centered on center frequency 192 (11 MHz) of transmission signal 200, and exhibits a bandwidth of 2 MHz, extending between 10 MHz and 12 MHz. Transmission signal 190 further includes basic signal copies $194_{-3}$, $194_{-2}$, $194_{-1}$, $194_{+1}$, $194_{+2}$ and $194_{+3}$.

Basic signal copies $194_{-3}$, $194_{-2}$ and $194_{-1}$ are respectively centered on center frequencies of 5 MHz, 7 MHz and 9 MHz and exhibit bandwidths of 2 MHz, each. Accordingly, basic signal copies $194_{-3}$, $194_{-2}$ and $194_{-1}$ are respectively compatible with basic signal copy $164_{-1}$, basic signal $164_0$ and basic signal copy $164_{+1}$. Together, basic signal copies $194_{-3}$, $194_{-2}$ and $194_{-1}$ form a signal which is compatible with the requirements of the HPNA-2 communication standard first mode of operation HPNA-2A, and hence, when received by an HPNA-2 unit they shall be perceived as a first mode of operation HPNA-2A transmission.

With reference to FIG. 5B, transmission signal 220 includes a basic signal $224_0$, which is centered on center frequency 192(11 MHz) of transmission signal 200, and exhibits a bandwidth of 4 MHz, extending between 9 MHz and 13 MHz. Transmission signal 220 further includes basic signal copies $224_{-2}$, $224_{-1}$, $224_{+1}$ and $224_{+2}$. It is noted that basic signal copies $224_{-2}$ and $224_{+2}$ are partial copies of basic signal $224_0$, as transmission signal 220 is limited by the same bandwidth filter which limits signal 204.

Basic signal copies $224_{-1}$ and $224_{+1}$ are respectively centered on center frequencies of 7 MHz and 15 MHz and exhibit bandwidths of 4 MHz, each. Partial basic signal copies $224_{-2}$ and $224_{+2}$ are theoretically centered on center frequencies of 3 MHz and 19 MHz, respectively, and exhibit a theoretical bandwidths of 4 MHz, each. According to the overall frequency range of 14 MHz defined by HPNA-X, partial basic signal copies $224_{-2}$ and $224_{+2}$ are truncated above below 4 MHz and above 18 MHz, respectively, by a truncating bandwidth filter.

Accordingly, partial basic signal copy $224_{-2}$ is compatible with partial basic signal copy $214_{-1}$, basic signal copy $224_{-1}$ is compatible with basic signal $214_0$ and the portion of basic signal copy $224_0$ from 9 MHz to 10 MHz is compatible with partial basic signal copy $214_{+1}$. Together, partial basic signal copy $224_{-2}$, basic signal copy $224_{-1}$ and the portion of basic signal copy $224_{-1}$ from 9 MHz to 10 MHz form a signal which is compatible with the requirements of the HPNA-2 communication second mode of operation HPNA-2B, and hence, when received by an HPNA-2 unit they shall be perceived as a second mode of operation HPNA-2B transmission.

As described above, both transmission signals 190 and 220 are produced using the same carrier signal center frequency.

Accordingly, the disclosed technique maintains an old generation bandwidth in a new generation bandwidth, thereby efficiently exploiting bandwidth resources, which are often limited.

Figure 6:
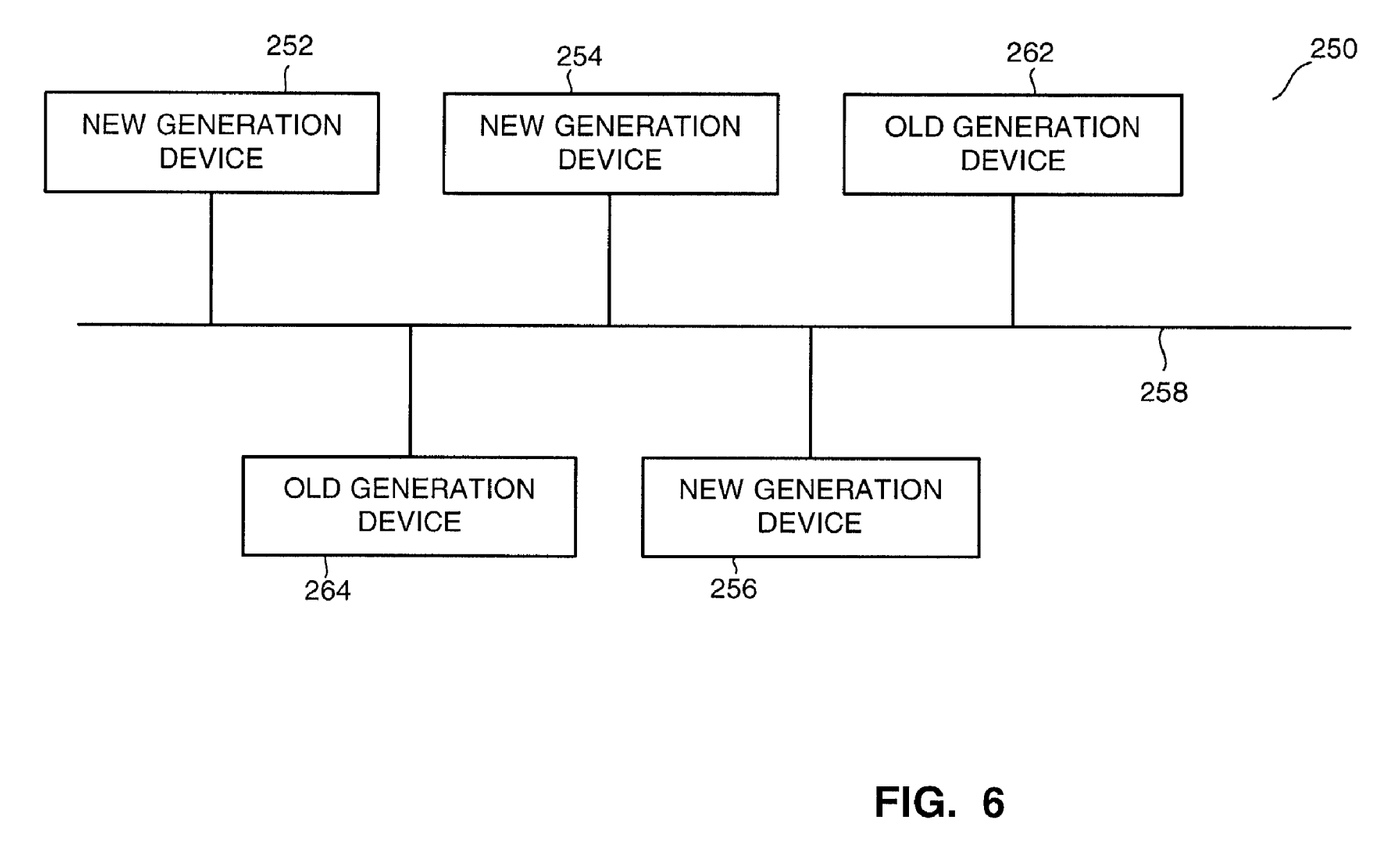
FIG. 6 is a schematic illustration of a network, which includes communication devices from different generations.

Reference is now made to FIG. 6, which is a schematic illustration of a network architecture, generally referenced 250, which includes communication devices from different generations.

Network architecture 250 included a network 258, two old generation communication devices 262 and 264 and three new generation communication devices 252, 254 and 256. Old generation communication devices 262 and 264 are operative to produce and transmit message according to an old communication standard (OCS) and are further operative to receive and decipher such messages. New generation communication devices 252, 254 and 256 are operative to produce and transmit messages according to a new communication standard (NCS) and are further operative to receive and decipher such messages. New generation communication devices 252, 254 and 256 are further operative to produce and transmit messages, which are compatible with the old communication standard (OCS), according to the disclosed technique.

Network architecture 250 is constructed according to a bus architecture. Hence, all of the communication devices 252, 254, 256, 262 and 264, which are coupled therewith, are operative to detect any signal which is transmitted over the network, provided that this signal is within their respective frequency range. However, it is noted that any architecture is applicable for the disclosed technique.

When new generation communication devices are transmitting data across the network, old generation communication devices, must be able to ignore such data, that is broadcast using new generation format, not intended for old generation units. In accordance with another embodiment of the disclosed technique, such data is encapsulated, so as to include a header portion, produced in old generation format, instructing old generation communication device to ignore the rest of the data. The rest of the data, is produced in new generation format, and is accessed, only by the new generation communication devices.

Figure 7:
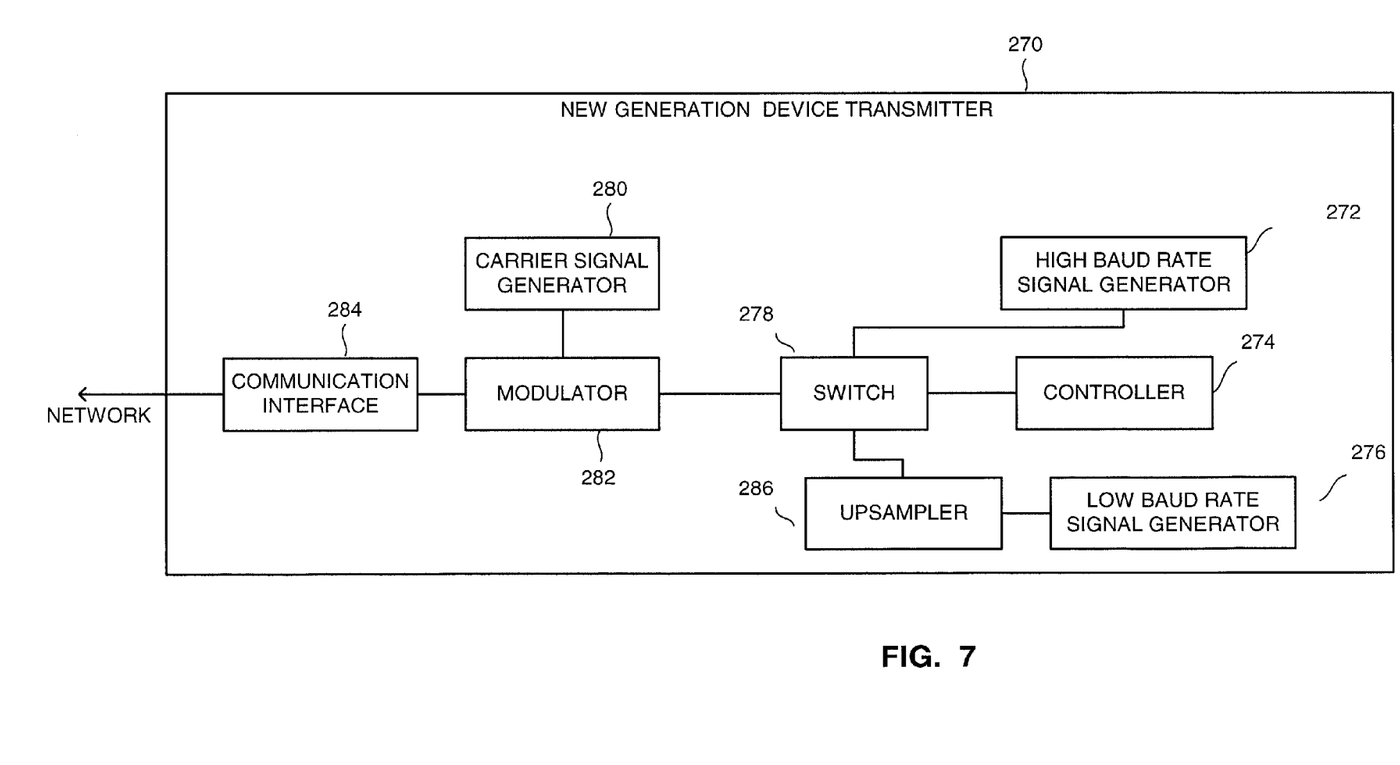
FIG. 7 is a schematic illustration of a new generation device transmitter, constructed and operative in accordance with a further embodiment of the disclosed technique.

Reference is now made to FIG. 7, which is a schematic illustration of a transmitter, generally referenced 270, of new generation device 252 of FIG. 6, constructed and operative in accordance with another embodiment of the disclosed technique.

Transmitter 270 includes a high baud rate signal generator 272, a low baud rate signal generator 276, an up-sampler 286, a switch 278, a controller 274, a modulator 282, a carrier signal generator 280 and a communication interface 284.

High baud rate signal generator 272 and up-sampler 286 are alternately coupled with switch 278. Low baud rate signal generator 276 is further coupled with up-sampler 286. Switch 278 is further coupled with controller 271. Modulator 282 is coupled with switch 278, with carrier signal generator 280 and with communication interface 284. Communication interface 284 is further coupled with network 258 (not shown) of FIG. 6.

Transmitter 270 is operative to produce transmission signals compatible with both old generation format devices and new generation format devices, by employing the technique illustrated above.

When transmitting to new generation format devices, transmitter 270 uses high baud rate signal generator 272, to create Baseband data. High baud rate signal generator 272 provides the Baseband data to modulator 282, via switch 278. Carrier signal generator 280 produces a carrier signal and provides it to modulator 282. Modulator 282 modulates the high baud rate Baseband signal with the carrier signal, thereby producing a transmission signal. Modulator 282 provides the transmission signal to communication interface 284, which in turn, transmits the transmission signal to network 258.

When transmitting to old generation format devices, transmitter 270 uses low baud rate signal generator 276, to create Baseband data. Low baud rate signal generator 276 provides the Baseband data to up-sampler 286. Up-sampler 286 performs up-sampling of the data, producing a Baseband signal, which includes multiple copies of old generation Baseband signal, in accordance with the technique illustrated above. Up sampler 286 provides the up-sampled Baseband signal to modulator 282, via switch 278. Other elements of the transmission path are unchanged with respect to transmission to new generation format devices.

According to the example set forth in FIG. 2, when transmitting to new generation format devices, transmitter 270 creates Baseband data, using high baud rate signal generator 272, having a bandwidth of $BW_2$. Modulator 282 modulates Baseband data with carrier signal from carrier signal generator 280, having a frequency 112, to produce transmission signal 120. When transmitting to old generation format devices, transmitter 270 creates Baseband data, using low baud rate signal generator 276, having a bandwidth of $BW_1$. Up-sampler 286, up-samples the Baseband data, to produce multiple Baseband signal copies $114_{-2}$, $114_{-1}$, $114_{-0}$, $114_{+1}$, and $114_{+2}$. Modulator 282 modulates up-sampled Baseband data with carrier signal from carrier signal generator 280, having a frequency 112, to produce transmission signal 110, which includes basic signal $114_0$ and basic signal copies $114_{-2}$, $114_{-1}$, $114_{+1}$ and $114_{+2}$.

According to the example set forth in FIG. 4, when transmitting to new generation format devices, transmitter 270 creates Baseband data, using high baud rate signal generator 272, having a bandwidth of 10 MHz. Modulator 282 modulates Baseband data with carrier signal from carrier signal generator 280, having a frequency of 9 MHz, to produce transmission signal 180. When transmitting to old generation format devices, transmitter 270 creates Baseband data, using low baud rate signal generator 276, having a bandwidth of 2 MHz. Up-sampler 286, up-samples Baseband signal, to produce multiple copies $174_{-2}$ to $174_{+2}$, of Baseband signal. Modulator 282 modulates up-sampled Baseband data with carrier signal from carrier signal generator 280, having a frequency of 9 MHz, to produce a transmission signal 170, which includes basic signal $174_0$ and basic signal copies $174_{-2}$, $174_{-1}$, $174_{+1}$ and $174_{+2}$.

Controller 274 performs selection between different generation format data, by operating switch 278, to couple with desired signal generator. Controller 274 is controlled by other elements (not shown) of communication device 252 (FIG. 6). Communication interface 284 may be constructed to couple with a wired network or a wireless network.

Alternatively, the low baud rate signal generator, and the high baud rate signal generator, may be combined in a single signal generator element. In such an embodiment, both signals are provided by up-sampling a signal generator, having a signal rate, higher than the high baud rate required. Other aspects of the transmitter remain essentially the same as described for the transmitter in FIG. 7.

It will be appreciated by those skilled in the art, that up-sampling the low baud rate data, can be performed, by an up-sampler, coupled with low baud rate signal generator, as illustrated in FIG. 7. It is noted that the up-sampler, can be incorporated in the low baud rate signal generator or in the switch, in a single element.

Figure 8:
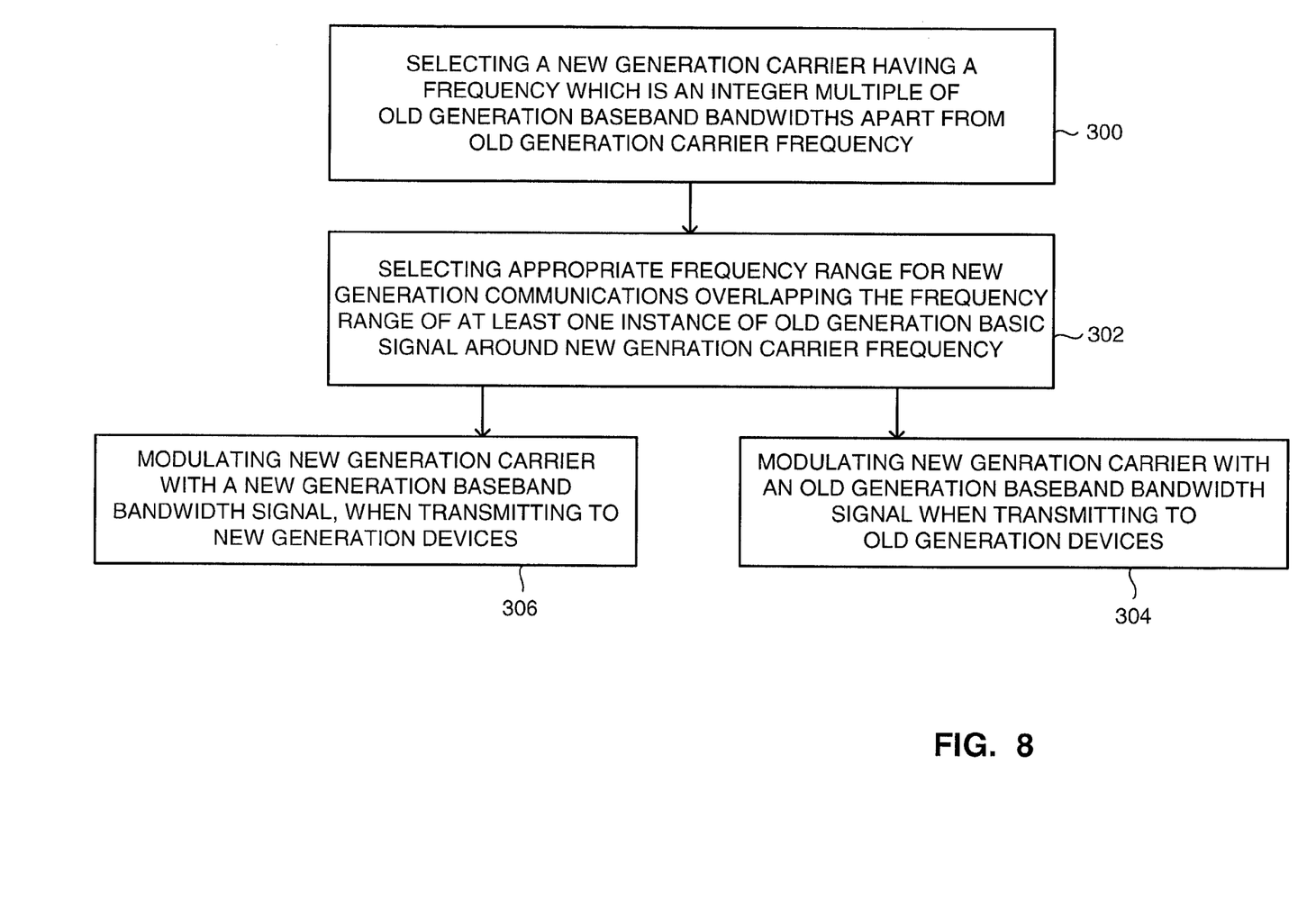
FIG. 8 is a schematic illustration of a method for backward compatible communication, operative in accordance with another embodiment of the disclosed technique.

Reference is now made to FIG. 8, which is a schematic illustration of a method for backward compatible communication, operative in accordance with another embodiment of the disclosed technique.

In procedure 300, a carrier frequency for a new generation device is selected. The carrier frequency is selected to be an integer multiple of old generation bandwidths, away from old generation carrier frequency. In the example set forth in FIG. 4, a 9 MHz carrier frequency is selected, being 2 MHz apart from the 7 MHz carrier frequency of the old generation devices, which have a bandwidth of 2 MHz. It is noted that the new generation carrier frequency could have been selected to be any integer multiple of 2 MHz away from the 7 MHz carrier, such as, 11 Mhz, 15 Mhz, etc. It is further noted that the new generation carrier frequency can be lower than the old generation carrier frequency, as described in FIG. 3.

In procedure 302, the appropriate frequency range for the new generation device is selected. The frequency range is selected so as to overlap at least one instance, of the old generation basic signals. In the example set forth in FIG. 4, the selected frequency range, between 4 MHz and 14 MHz, overlaps all three instances of the old generation basic signal, $164_{-1}$, $164_0$ and $164_{+1}$. It is noted that the selected frequency range, could have been selected to overlap one, or two of the basic signal instances, for example, by selecting a frequency range of 8 MHz-12 MHz, which overlaps only one instance of the basic signals referenced $164_{+1}$).

Procedure 304 is directed for transmitting to old generation devices. In procedure 304, an old generation Baseband bandwidth signal modulates the new generation carrier signal, thereby producing a transmission signal which includes at least one instance of a basic signal according to the old generation format, in accordance with the principles, illustrated above. For example, according to a digital approach, the old generation Baseband bandwidth signal includes data which was sampled according to old generation baud rate.

In the example set forth in FIG. 4, 2 MHz sampled data, is used to modulate the 9 MHz carrier signal. The resulting transmission signal includes instances of old generation format basic signal $174_{-2}$, $174_{-1}$, $174_0$, $174_{+1}$, and $174_{+2}$. Basic signals $174_{-2}$, $174_{-1}$ and $174_0$, are compatible with old generation basic signals $164_{-1}$, $164_0$ and $164_{+1}$, thus allowing old generation devices to demodulate the transmitted signal and extract the data.

Procedure 306 is directed for transmitting to new generation devices. In procedure 306, a new generation Baseband bandwidth signal, modulates the new generation carrier signal, thereby producing a transmission signal which includes a single instance of a basic signal according to the new generation format. For example, according to a digital approach, the new generation Baseband bandwidth signal includes data which was sampled according to new generation baud rate In the example set forth in FIG. 4, 10 MHz sampled data, is used to modulate the 9 MHz carrier signal. The resulting transmission signal includes a single instance of the modulated signal 180.

It will be appreciated by persons skilled in the art that the present invention is not limited to what has been particularly shown and described hereinabove. Rather the scope of the present invention is defined only by the claims, which follow.

The invention claimed is:

1. Communications method comprising the procedure of:
   modulating a second generation carrier signal with a first generation Baseband bandwidth signal having a first generation Baseband bandwidth when transmitting to first generation devices,
   wherein the frequency of said second generation carrier signal is an integer multiple transmitting the second generation carrier signal, of said first generation Baseband bandwidth away from a first generation carrier signal frequency.

2. The communications method according to claim 1, further comprising the procedure of:
   modulating said second generation carrier signal with a second generation Baseband bandwidth signal when transmitting to second generation devices.

3. The communications method according to claim 1, further comprising the procedure of:
   selecting a second generation frequency range, around said second generation carrier frequency, said second generation frequency range overlapping a frequency range of at least one instance of a said first generation basic signal.

4. The communications method according to claim 1, wherein said first generation Baseband bandwidth signal is in digital format.

5. The communications method according to claim 2, wherein said second generation Baseband bandwidth signal is in digital format.

6. The communications method according to claim 1, wherein said second generation carrier signal is in digital format.

7. Communications method comprising the procedure of:
   selecting a second generation carrier frequency for a second generation carrier signal, said second generation carrier frequency being an integer multiple of a first generation Baseband bandwidth away from a first generation carrier signal frequency; and
   modulating said second generation carrier signal with a first generation Baseband bandwidth signal when transmitting to first generation devices.

8. The communications method according to claim 7, further comprising the procedure of:
   modulating said second generation carrier signal with a first generation Baseband bandwidth signal when transmitting to second generation devices.

9. The communications method according to claim 7, further comprising the procedure of:
   selecting a second generation frequency range, around said second generation carrier frequency, said second generation frequency range overlapping a frequency range of at least one instance of a first generation basic signal.

10. The communications method according to claim 7, wherein said first generation Baseband bandwidth signal is in digital format.

11. The communications method according to claim 7, wherein said second generation Baseband bandwidth signal is in digital format.

12. The communications method according to claim 7, wherein said second generation carrier signal is in digital format.

13. Multiple generation communications device comprising:
   a first signal generator generating a first generation Baseband bandwidth signal having a first generation Baseband bandwidth;
   a second signal generator generating a second generation Baseband bandwidth signal;
   a controller;
   a switch coupled with said controller, said first signal generator, and said second signal generator;
   carrier signal generator providing a second generation carrier signal, the frequency of said second generation carrier signal is an integer number of said first generation Baseband bandwidths away from the frequency of a first generation carrier signal;
   a modulator coupled with said switch and said carrier signal generator,
   wherein said switch couples said first signal generator with said modulator when said controller selects said first generation Baseband bandwidth signal to modulate said second generation carrier signal;
   wherein said switch couples said second signal generator with said modulator when said controller selects said second generation Baseband bandwidth signal to modulate said second generation carrier signal; and
   wherein said modulator modulates the selected one of said first generation Baseband bandwidth signal and said second generation Baseband bandwidth signal with said second generation carrier signal thereby producing a transmission signal.

14. The multiple generation communications device according to claim 13, further comprising a communication interface coupled with said modulator, said communication interface providing said transmission signal to a network.

15. The multiple generation communications device according to claim 13, further comprising an up-sampler coupled with said first signal generator, said up-sampler up-sampling sampled Baseband data thereby producing multiple copies of said sampled Baseband data.

16. The multiple generation communications device according to claim 13, wherein said controller selects said first generation Baseband bandwidth signal to modulate said second generation carrier signal when transmitting to first generation communication devices.

17. The multiple generation communications device according to claim 13, wherein said controller selects said second generation Baseband bandwidth signal to modulate said second generation carrier signal when transmitting to second generation communication devices.

18. The multiple generation communications device according to claim 13, wherein said first generation Baseband bandwidth signal is in digital format.

19. The multiple generation communications device according to claim 13, wherein said second generation Baseband bandwidth signal is in digital format.

20. The multiple generation communications device according to claim 13, wherein said second generation carrier signal is in digital format.

21. The multiple generation communications device according to claim 13, wherein said communication interface is further coupled with a wired network.

22. The multiple generation communications device according to claim 13, wherein said communication interface is further coupled with a wireless network.

23. Multiple generation communications network architecture comprising:
a network;
at least one first generation communications device coupled with said network; and
at least one second generation communications device coupled with said network,
wherein at least one of said at least one second generation communications device comprises:
a first signal generator generating a first generation Baseband bandwidth signal having a first generation Baseband bandwidth;
a second signal generator generating a second generation Baseband bandwidth signal;
a controller;
a switch coupled with said controller, said first signal generator, and said second signal generator;
a carrier signal generator providing a second generation carrier signal, the frequency of said second generation carrier signal is an integer number of said first generation Baseband bandwidth away from the frequency of a first generation carrier signal;
a modulator coupled with said switch and said carrier signal generator;
wherein said switch couples said first signal generator with said modulator when said controller selects said first generation Baseband bandwidth signal to modulate said second generation carrier signal;
wherein said switch couples said second signal generator with said modulator when said controller selects said second generation Baseband bandwidth signal to modulate said second generation carrier signal; and
wherein said modulator modulates the selected one of said first generation Baseband bandwidth signal and said second generation Baseband bandwidth signal with said second generation carrier signal thereby producing a transmission signal.

24. The multiple generation communications network according to claim 23, wherein said network is a digital network.

25. The multiple generation communications network according to claim 23, wherein said network is a wired network.

26. The multiple generation communications network according to claim 23, wherein said network is a wireless network.

27. A backward compatible transmitter for transmitting to first generation devices comprising:
means for supplying a second generation carrier signal and a first generation Baseband bandwidth signal; and
means for modulating said second generation carrier signal with said first generation Baseband bandwidth signal
wherein the frequency of said second generation carrier signal is an integer multiple of said first generation Baseband bandwidth away from a first generation carrier signal frequency.

28. The backward compatible transmitter according to claim 27, wherein said means for modulating further modulates said second generation carrier signal with a second generation Baseband bandwidth signal when transmitting to second generation devices.

29. The backward compatible transmitter according to claim 27, further comprising means for selecting a second generation frequency range around said second generation carrier frequency, said second generation frequency range overlapping the frequency range of at least one instance of a first generation basic signal.

30. A backward compatible transmitter comprising:
means for selecting a second generation carrier frequency for a second generation carrier signal, said second generation carrier frequency being an integer multiple of a first generation Baseband bandwidth away from a first generation carrier signal frequency; and
means for modulating said second generation carrier signal with a first generation Baseband bandwidth signal when transmitting to first generation devices.

31. The backward compatible transmitter according to claim 30, wherein said means for modulating also modulates said second generation carrier signal with a second generation Baseband bandwidth signal when transmitting to second generation devices.

32. The backward compatible transmitter according to claim 30, further comprising means for selecting a second generation frequency range around said second generation carrier frequency, said second generation frequency range overlapping a frequency range of at least one instance of a said first generation basic signal.

33. Multiple generation communications device comprising:
means for generating a first generation Baseband bandwidth signal having a first generation Baseband bandwidth;
means for generating a second generation Baseband bandwidth signal;
means for controlling;
means for switching coupled with said means for controlling, said means for generating said first signal generation Baseband bandwidth signal, and said means for generating said second signal generation Baseband bandwidth signal;
means for generating a second generation carrier signal, the frequency of said second generation carrier signal is an integer number of said first generation Baseband bandwidth away from the frequency of a first generation carrier signal;
means for modulating coupled with said means for switching and said means for generating a second generation carrier signal, wherein said means for switching couples said means for generating said first signal generation Baseband bandwidth signal with said means for modulating when said means for controlling selects said first generation Baseband bandwidth signal to modulate said second generation carrier signal;
wherein said means for switching couples said means for generating said second signal generation Baseband bandwidth signal with said means for modulating when said means for controlling selects said second generation Baseband bandwidth signal to modulate said second generation carrier signal; and
wherein said means for modulating modulates the selected one of said first generation Baseband bandwidth signal and said second generation Baseband bandwidth signal with said second generation carrier signal thereby producing a transmission signal.

34. The multiple generation communications device according to claim 33, further comprising means for interfacing with a communication network coupled with said means for modulating, said means for interfacing with a communication network providing said transmission signal to a network.

35. The multiple generation communications device according to claim 33, further comprising means for up-sampling coupled with said means for generating said first signal generation Baseband bandwidth signal for up-sampling sampled Baseband data thereby producing multiple copies of said sampled Baseband data.

36. The multiple generation communications device according to claim 33, wherein said means for controlling selects said first generation Baseband bandwidth signal to modulate said second generation carrier signal when transmitting to first generation communication devices.

37. The multiple generation communications device according to claim 33, wherein said means for controlling selects said second generation Baseband bandwidth signal to modulate said second generation carrier signal when transmitting to second generation communication devices.

* * * * *